Patented May 6, 1952

2,595,848

UNITED STATES PATENT OFFICE 2,595,848

DYEABLE COPOLYMERS

George E. Ham, Dayton, Ohio, assignor, by mesne assignments, to The Chemstrand Corporation, a corporation of Delaware No Drawing. Application February 27, 1950, Serial No. 146,631

16 Claims. (Cl. 260—85.5)

This invention relates to a method of preparing acrylonitrile polymers having desirable receptivity for commercially available dyes. More specifically the invention relates to acrylonitrile polymers and fibers produced therefrom which can be dyed by conventional dyeing procedures utilizing acid dyes.

Polymers of acrylonitrile, such as polyacrylonitrile and copolymers of 75 or more percent of acrylonitrile and up to 25 percent of other monomers copolymerizable therewith, such as vinyl acetate, methyl methacrylate and methacrylonitrile, are well known to be excellent fiber forming materials. However, due to poor dye receptivity, these known copolymers are of limited utility and of little value in the preparation of general purpose fibers. In copending application Serial No. 106,490, filed July 23, 1949, by George E. Ham and in application Serial No. 123,093, filed October 22, 1949, by George E. Ham, there are described and claimed non-dyeable acrylonitrile polymers which are capable of chemical reaction with a wide variety of reagents, including trimethylamine and ammonia, whereby the copolymers are rendered capable of accepting dyes. This chemical reaction converts the copolymers containing $\alpha$-chlorocarboxylate radicals into copolymers containing amino and quaternary ammonium salt groups which is believed to be responsible for the improved dye receptivity.

The above described dye receptive copolymers and the methods of preparing them are subject to inherent limitations due to the instability of the spinning solutions. The described methods are useful in the conventional fiber spinning procedures whereby the acrylonitrile copolymers are dissolved in suitable solvents, for example N,N - dimethylformamide, N,N - dimethylacetamide, famma-butyrolactone, and N,N-dimethylmethoxyacetamide. Solutions of the acrylonitrile polymers in the said solvents may be extruded to form fibers if the operation is conducted soon after the preparation of the solutions, otherwise gelation of the solutions may take place. If the spinning operations are not conducted promptly, or if there is an interruption of the normal spinning procedures, excessive losses of time and material may be experienced.

The primary purpose of the present invention is to provide a new procedure of spinning whereby gelation of polymer solutions is avoided. A further purpose of the present invention is to provide acrylonitrile copolymers capable of being dyed by conventional dyeing procedures. A still further purpose of the invention is to provide dyeable, general purpose fibers of high tenacity from acrylonitrile.

It has been found that fiber forming copolymers of acrylonitrile and the vinyl, allyl and methallyl esters of $\alpha$-halocarboxylic acids may be made dye-receptive by reacting the copolymer with an alkali metal salt of a mercaptosubstituted-nitrogen heterocyclic compound. Suitable compounds of this type are sodium salt of mercaptobenzothiazole, the other alkali metal salts of mercaptobenzothiazole, and the alkali metal salts of 2-mercaptopyridine, 3-mercapto-1,2,4-triazole, 2-mercapto-4,5-benzo-1,3-triazine, 2-mercaptobenzothiazine, 2-mercapto-4-phenylthiazole, 3-mercapto-5-phenyl-1,2,4-triazine, 2-mercaptobenzoxazole, 1 - phenyl - 3 - mercapto - 1,2,4-triazolone-5, and other mercapto substituted compounds containing nitrogen hetero rings and the mercapto groups substituted on a carbon atom of the ring.

The alkali metal salts of these mercapto-nitrogen hetero compounds react with the $\alpha$-halocarboxylate radicals of the polymers to form molecular groups containing cyclic tertiary nitrogen atoms capable of chemically combining with acid dyestuffs, particularly the sulfonic acid dyes. The chemical reaction involves using the sodium salt of mercapto benzothiazole and may be represented by the following equation:

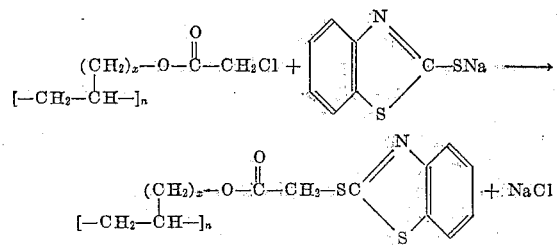

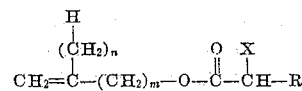

Suitable copolymers for the practice of this invention are copolymers of 75 to 98 percent by weight of acrylonitrile and from two to 25 percent of an ester having the structural formula:

$$CH_2=C-(CH_2)_m-O-\overset{O}{\underset{\|}{C}}-\overset{X}{\underset{|}{C}H}-R$$
$$\underset{(CH_2)_n}{\overset{H}{|}}$$

wherein X is a halogen atom of the group consisting of chlorine and bromine, R is a radical of the group consisting of hydrogen and alkyl having up to four carbon atoms, $m$ and $n$ are each whole numbers from zero to one, inclusive, and $n$ is not greater than $m$. Although the copolymers of 75 to 98 percent of acrylonitrile and from two to 25 percent of the monomers may be utilized in the practice of this invention, a preferred group of the copolymers are those of 80 to 95 percent acrylonitrile and from five to 20 percent of the said monomer. The copolymers of 75 to 80 percent acrylonitrile have unusually desirable dye receptivity, but often are found to have less than the optimum fiber forming properties. On the other hand copolymers of 95 to 98 percent acrylonitrile and from two to five percent of the comonomer have unusually good fiber-forming properties, but often lack sufficient dye receptivity for optimum utility.

The reactive copolymers may, if desired, contain small proportions of other monomers copolymerized therewith, for example up to ten percent of styrene, methacrylonitrile, alkyl acrylates, alkyl methacrylates, vinylidene chloride, alkyl fumarates, alkyl maleates or other polymerizable monoolefinic monomer. In general the proportions of other comonomers should not be large or either the dyeability or the optimum fiber properties may be lost.

In the practice of this invention the non-dyeable copolymers are treated with an alkali metal salt of the mercapto substituted N-heterocyclic compound to develop dye receptivity. The copolymers may be treated with the reagent directly or with solutions of the reagent in water or other liquid media in which it is soluble. In the practice of this modification of the invention the reagent is dissolved in the solvent at any suitable temperature up to 150° C. and the finely ground copolymers are dispersed in the solution.

A further procedure by which the present invention may be practiced involves the preliminary preparation of fibers of the non-dyeable copolymers and subsequent treatment with the alkali metal salts of the mercapto substituted N-heterocyclic compound, either in solid finely divided form or in suitable solution. Since this treatment will be primarily a surface effect, obviously an effective improvement in dyeability will be achieved with a minimum quantity of reagent. A desirable procedure by which the treatment of the fiber can be effected, involves the treatment with a mixture of water and a suitable solvent for acrylonitrile copolymers in which the reagent has been dissolved or dispersed.

The alkali metal salts of the mercaptans may be used as solutions to treat the fibers. Aqueous solutions are usually preferred. The concentration of the salt may vary greatly in the practice of the invention. If the fibers to be treated have a high concentration of reactive α-chlorocarboxylate groups very dilute solutions may be used, this being especially true if treatment at elevated temperatures is contemplated. On the other hand very concentrated solutions are desirable for room temperature treatment of the fibers, and especially when very small concentrations of the reactive α-halocarboxylate radicals are present in the copolymer. Thus, the concentration of reagent will depend upon the number of reactive groups in the copolymer, upon the amount of polymer surface available for reaction, and upon the conditions of reaction, such as temperature and time of immersion. A fiber or polymer will be improved with respect to its dye acceptance by treatment with the reagent regardless of the extent of its presence in the reaction medium.

The acrylonitrile copolymers may be prepared by any conventional polymerization procedure, but the preferred practice utilizes suspension polymerization wherein the copolymer is prepared in finely divided form for immediate use in the fiber fabrication operations. The preferred suspension polymerization may utilize batch procedures, wherein monomers are charged with an aqueous medium containing the necessary catalyst and dispersing agents. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of copolymer may also be employed.

The polymerization is catalyzed by means of any water soluble peroxy compound, for example the potassium, ammonium and other water soluble salts of peroxy acids, sodium peroxide, hydrogen peroxide, sodium perborate, the sodium salts of other peroxy acids, and any other water soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanolamine and dodecylmethylamine, salts of rosin acids and mixtures thereof, the water soluble salts of half esters of sulfuric acid and long chain aliphatic alcohols, sulfonated hydrocarbons, such as alkyl aryl sulfonates, and any other of a wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally, rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated is within the province of one skilled in the art.

The optimum methods of polymerization for preparing fiber-forming acrylonitrile polymers involve the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from .001 to two percent on the weight of the monomer to be polymerized.

When the polymerization is complete, the polymer is separated from the aqueous medium by any of the conventionally used methods. If the dispersion is very stable, it may be necessary to break the emulsion, for example by adding acids, bases, salts of alcohol. When the optimum procedures above described are used, the polymer may be separated from the aqueous phase by filtration. The resulting polymer in either case may require washing operations to remove traces of soluble catalyst or dispersing agent.

The most effective copolymers for the preparation of fibers are those of uniform physical and chemical properties and of relatively high molecular weight. The copolymers should have molecular weights in excess of 10,000 and preferably between 25,000 and 150,000.

The copolymers of acrylonitrile and the reactive comonomers are spun into fibers by conventional procedures. The polymers are dissolved in suitable solvents, for example N,N-dimethylformanide, N,N-dimethylacetamide, and N,N-dimethylmethoxyacetamide, and the solutions extruded through a suitable die, or a spinneret containing a plurality of apertures into a medium which removes the solvent and precipitates the polymer in a continuous form. The spinning medium may be a liquid medium, for example glycerine, water, or aqueous solutions of salts, acids or bases, or aqueous mixtures of organic liquids, such as glycerine or even liquids which are solvents for the polyacrylonitrile. The use of aqueous mixtures of conventional acrylonitrile polymer solvents produces a fiber of more desirable physical properties than is prepared by precipitation into water alone. The fiber may also be extruded into air or other gaseous medium by conventional dry spinning methods.

Further details of the practice of this invention are set forth with respect to the following examples.

Example 1

A copolymer of 92 percent acrylonitrile and eight percent allyl chloroacetate was spun into fibers from a 21 percent solution in N,N-dimethylacetamide. A skein of fiber (0.6 gram) was treated with a mixture of 1.89 grams of mercaptobenzothiazole, 0.45 gram of sodium hydroxide, 60 mls. of water for five minutes at 100° C. The fiber was then washed and dried. The fiber was then dyed in a dye bath containing 0.6 ml. of 2% Wool Fast Scarlet, 3.0 mls. of 5% sulfuric acid, and 24 mls. of distilled water for one hour at 100° C. A deep scarlet fiber was produced with dye bath exhaustion.

The identical fiber which was not treated with mercaptobenzothiazole was dyed a pale pink by the same procedure.

Example 2

Using the procedure as described above a copolymer of 96.7 percent acrylonitrile and 3.3 percent of vinyl chloroacetate was prepared into fibers and dyed. The fiber treated with the sodiomercaptobenzothiazole solution absorbed the dye and became brilliant scarlet in color. The untreated sample absorbed practically no dye.

The invention is defined by the following claims:

1. A dye receptive copolymer of 75 to 98 percent by weight of acrylonitrile and from two to 25 percent of a compound having the formula:

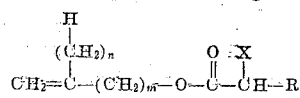

wherein X is an atom of the group consisting of chlorine and bromine, R is a radical of the group consisting of hydrogen and alkyl radicals having up to four carbon atoms, m and n are small whole numbers from zero to one, inclusive, and n is not greater than m, said copolymer having been chemically reacted with an alkali metal salt of a mercapto substituted N-heterocyclic compound wherein the mercapto group is substituted on a carbon atom.

2. A dye receptive copolymer of 75 to 98 percent by weight of acrylonitrile and from two to 25 percent of allyl chloroacetate, said copolymer having been chemically reacted with the sodium salt of mercaptobenzothiazole.

3. A dye receptive copolymer of 75 to 98 percent by weight of acrylonitrile and from two to 25 percent or vinyl chloroacetate, said copolymer having been chemically reacted with the sodium salt of mercaptobenzothiazole.

4. A dye receptive copolymer of 75 to 98 percent by weight of acrylonitrile and from two to 25 percent of methallyl chloroacetate, said copolymer having been chemically reacted with the sodium salt of mercaptobenzothiazole.

5. A dye receptive copolymer of 80 to 95 percent by weight of acrylonitrile and from five to 20 percent of a compound having the formula:

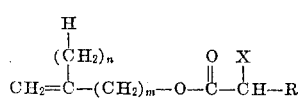

wherein X is an atom of the group consisting of chlorine and bromine, R is a radical of the group consisting of hydrogen and alkyl radicals having up to four carbon atoms, m and n are small whole numbers from zero to one, inclusive, and n is not greater than m, said copolymer having been chemically reacted with an alkali metal salt of a mercapto substituted N-heterocyclic compound wherein the mercapto group is substituted on a carbon atom.

6. A dye receptive copolymer of 80 to 95 percent by weight of acrylonitrile and from five to 20 percent of allyl chloroacetate, said copolymer having been chemically reacted with a sodium salt of mercaptobenzothiazole.

7. A dye receptive copolymer of 80 to 95 percent by weight of acrylonitrile and from five to 20 percent of vinyl chloroacetate, said copolymer having been chemically reacted with the sodium salt of mercaptobenzothiazole.

8. A dye receptive copolymer of 80 to 95 percent by weight of acrylonitrile and from five to 20 percent of methallyl chloroacetate, said copolymer having been chemically reacted with the sodium salt of mercaptobenzothiazole.

9. A method of preparing dye receptive copolymers from copolymers of from 75 to 98 percent by weight of acrylonitrile and from two to 25 percent of a compound having the structural formula:

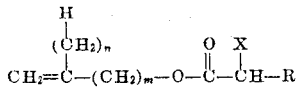

wherein X is an atom of the group consisting of chlorine and bromine, R is a radical of the group consisting of hydrogen and alkyl radicals having up to four carbon atoms, $m$ and $n$ are small whole numbers from zero to one, inclusive, and $n$ is not greater than $m$, which comprises chemically reacting the copolymers with an alkali metal salt of a mercaptosubstituted N-heterocyclic compound wherein the mercapto group is substituted on a carbon atom.

10. A method of preparing dye receptive copolymers from copolymers of from 75 to 98 percent by weight of acrylonitrile and from two to 25 percent of allyl chloroacetate, which comprises chemically reacting the copolymers with the sodium salt of mercaptobenzothiazole.

11. A method of preparing dye receptive copolymers from copolymers of from 75 to 98 percent by weight of acrylonitrile and from two to 25 percent of vinyl chloroacetate, which comprises chemically reacting the copolymers with the sodium salt of mercaptobenzothiazole.

12. A method of preparing dye receptive copolymers from copolymers of from 75 to 98 percent by weight of acrylonitrile and from two to 25 percent of methallyl chloroacetate, which comprises chemically reacting the copolymers with the sodium salt of mercaptobenzothiazole.

13. A method of preparing dye receptive copolymers from copolymers of from 80 to 95 percent by weight of acrylonitrile and from five to 20 percent of a compound having the structural formula:

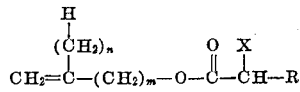

wherein X is an atom of the group consisting of chlorine and bromine, R is a radical of the group consisting of hydrogen and alkyl radicals having up to four carbon atoms, $m$ and $n$ are small whole numbers from zero to one, inclusive, and $n$ is not greater than $m$, which comprises chemically reacting the copolymers with an alkali metal salt of a mercapto substituted N-heterocyclic compound wherein the mercapto group is substituted on a carbon atom.

14. A method of preparing dye receptive copolymers from copolymers of from 80 to 95 percent by weight of acrylonitrile and from five to twenty percent of allyl chloroacetate, which comprises chemically reacting the copolymers with the sodium salt of mercaptobenzothiazole.

15. A method of preparing dye receptive copolymers from copolymers of from 80 to 95 percent by weight of acrylonitrile and from five to 20 percent of vinyl chloroacetate, which comprises chemically reacting the copolymers with the sodium salt of mercaptobenzothiazole.

16. A method of preparing dye receptive copolymers from copolymers of from 80 to 95 percent by weight of acrylonitrile and from five to 20 percent of methallyl chloroacetate, which comprises chemically reacting the copolymers with the sodium salt of mercaptobenzothiazole.

GEORGE E. HAM.

REFERENCES CITED

The following references are of record in the file of this patent:

FOREIGN PATENTS

| Number | Country | Date |
|--------|---------|------|
| 597,368 | Great Britain | Jan. 23, 1948 |